US006810630B2

(12) United States Patent
Chizmas

(10) Patent No.: US 6,810,630 B2
(45) Date of Patent: Nov. 2, 2004

(54) SPIRAL ANCHORING STAKE

(75) Inventor: Jeffrey J. Chizmas, Saugus, MA (US)

(73) Assignee: Aspen Pet Products, Inc., Denver, CO (US)

( * ) Notice: Subject to any disclaimer, the term of this patent is extended or adjusted under 35 U.S.C. 154(b) by 7 days.

(21) Appl. No.: 09/730,378

(22) Filed: Dec. 5, 2000

(65) Prior Publication Data

US 2002/0066240 A1 Jun. 6, 2002

(51) Int. Cl.$^7$ .............................................. E02D 5/74
(52) U.S. Cl. .............................. 52/155; 52/161; 52/157
(58) Field of Search ......................... 52/161, 155, 157; 248/530, 545

(56) References Cited

U.S. PATENT DOCUMENTS

| | | | | |
|---|---|---|---|---|
| 2,447,444 A | * | 8/1948 | Waite | 47/44 |
| 3,100,476 A | * | 8/1963 | Peak | 119/786 |
| 4,420,918 A | * | 12/1983 | Arnoux et al. | 52/157 |
| 4,658,678 A | * | 4/1987 | Pracht | 81/3.29 |
| 5,098,057 A | * | 3/1992 | Gran et al. | 248/156 |
| 5,148,641 A | * | 9/1992 | Rushing et al. | 52/103 |
| 5,457,918 A | * | 10/1995 | Plourde | 52/165 |
| 5,579,798 A | * | 12/1996 | Pruitt | 135/118 |
| 6,170,361 B1 | * | 1/2001 | Yates | 7/100 |

* cited by examiner

Primary Examiner—Carl D. Friedman
Assistant Examiner—Basil Katcheves
(74) Attorney, Agent, or Firm—Dorsey & Whitney LLP

(57) ABSTRACT

A spiral stake includes a handle structure which facilitates transfer of downwardly and torsionally directed forces from a user's hand to the stake during installation in the ground at a selected location. The spiral stake includes a spiral section, and a straight transition section extending between the handle and the spiral section. A portion of the handle contacting the users palm when downward and torsional force is applied thereto presents a convex curvature of suitable dimension and shape characteristics to distribute resistive forces comfortably to the user's hand. In a preferred embodiment, an opposed region of the handle contains a series of indentations forming a grip for the corresponding reception of the user's fingers, resulting in improved ergonomic feel and force-transfer efficiency. The opposed region is advantageously of sufficiently large dimension to accommodate all four fingers of an adult hand opposed to the thumb, to provide maximum comfort and to afford greater mechanical advantage during installation.

2 Claims, 3 Drawing Sheets

SPIRAL ANCHORING STAKE

BACKGROUND OF THE INVENTION

The present invention relates generally to stakes designed to be anchored in the ground, and more particularly, to stakes of the type which are screwed into ground structure and which serve as securement means for objects and animals.

Spiral stakes are well known in the art, and consist generally of a formed metal structure including a spirally configured metal section terminating at a lower end in a sharpened point to facilitate piercing of the ground in which it is to be anchored, and a modified shape at an upper end thereof serving as a rudimentary handle to permit transfer of hand-applied torsional force to the stake. When turned in an appropriate direction, usually clockwise, the spirally configured section (having a "right-handed" spiral corresponding to clockwise advancement), acts as a bit, drawing the spike downwardly of the surface of the ground. Continued turning of the spike imbeds the spiral section a sufficient depth in the ground to firmly affix same in the selected location.

Although such stakes find application in varied fields of use, a significant area of application of such articles is in the pet field, where they are employed for purposes of maintaining a tethered domesticated animal, most commonly a dog, within a restricted range of travel. When adapted to such purpose, generally a rotatable member, referred to hereinafter as a swivel, is captively mounted to a part of the stake extending above ground level, and which facilitates the tethered securement of a lead of desired length thereto, while concomitantly reducing the incidence of tangling associated with movement of the animal around the stake.

An example of a spiral stake of typical prior art construction and design is shown in FIG. 5. The conventional stake depicted therein, generally designated 100, is formed of a suitably shaped, structurally rigid material. The stake, in the depicted example, is conveniently formed of a metal rod which is bent in a manner creating a handle section 100a, a spiral section 100b, and a straight transition section 100c extending therebetween. Spiral section 100b terminates in a sharpened end 104, which facilitates penetration of the ground when rotation and downward force is imparted to the stake 100. Handle section 100a is configured to follow the general shape of a triangle, and in such prior art designs, permits reception of only a portion of the fingers of a user's hand, i.e. two or three of the fingers opposed to the thumb. A swivel 105 is provided in the region of the transition section 100c, which portion of the stake remains exposed when the spiral stake 100 is firmly anchored in the ground. Swivel 105 includes an attachment portion 105a formed by twisting a metal pin, having a head, loosely around the transition section 100c. The swivel 105 also includes a ring portion 105b having a flattened region with a hole formed therein large enough to receive the profile of attachment portion 105a, but configured smaller than the head portion thereof, thereby captively maintaining the ring portion 105a to the attachment portion 105a. Vertical movement of swivel 105 along transition section 100c is restricted by crimped areas 106 formed in the rod material comprising transition section 100c above and below swivel 105, which present flange-like sections preventing movement of attachment portion 105a of swivel 105 therepast.

Although effective as an anchoring device, such prior art stakes are not easily and comfortably installed in the ground, and such anchoring procedure frequently cannot be successfully implemented, particularly by women, children and the elderly, especially when the ground is dry and firmly packed. In addition, although the swivel is rotatable about the stake, the above-described construction may lead to binding of the swivel and the crimped regions due to play present between the attachment portion thereof and the rod comprising the stake.

It is therefore an object of the invention to provide a spiral stake which overcomes the drawbacks of the prior art.

It is a further object of the invention to provide a spiral stake which provides improved comfort to the user during its installation at a selected location and which facilitates installation at such location.

It is a still further object of the invention to provide a spiral stake having a modified structure inhibiting binding of the swivel and the stake to which it is rotatably mounted.

SUMMARY OF THE INVENTION

In accordance with these and other objects, there is provided a spiral stake having a specialized handle structure adapted to conform to the contours of a user's hand. Advantageously, the handle structure is configured to permit grasping thereof by the entirety of the user's hand, and presents a curved profile over a region brought into contact with the palm of the hand when gripped thereby to permit more comfortable and efficient transfer of downwardly applied force to the spiral stake during its anchoring in the ground.

Briefly stated, a spiral stake includes a spiral section, a handle section and a transition section extending therebetween. A portion of the handle contacting the users palm when downward and torsional forces are applied thereto advantageously presents a convex curvature of suitable dimension and shape characteristics to distribute resistive forces comfortably to the users hand. An opposed region of the handle contains a series of indentations forming a grip for the corresponding reception of the user's fingers, resulting in improved ergonomic feel and force-transfer efficiency. This opposed region is advantageously of sufficiently large dimension to accommodate all four fingers of an adult hand opposed to the thumb, to provide maximum comfort and to afford greater mechanical advantage during installation.

The various embodiments as disclosed herein may be conveniently produced by conventional overmolding processes in which a thermoplastic or other polymer is injection molded over a formed support structure, in the present instance, a formed metal spiral body.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
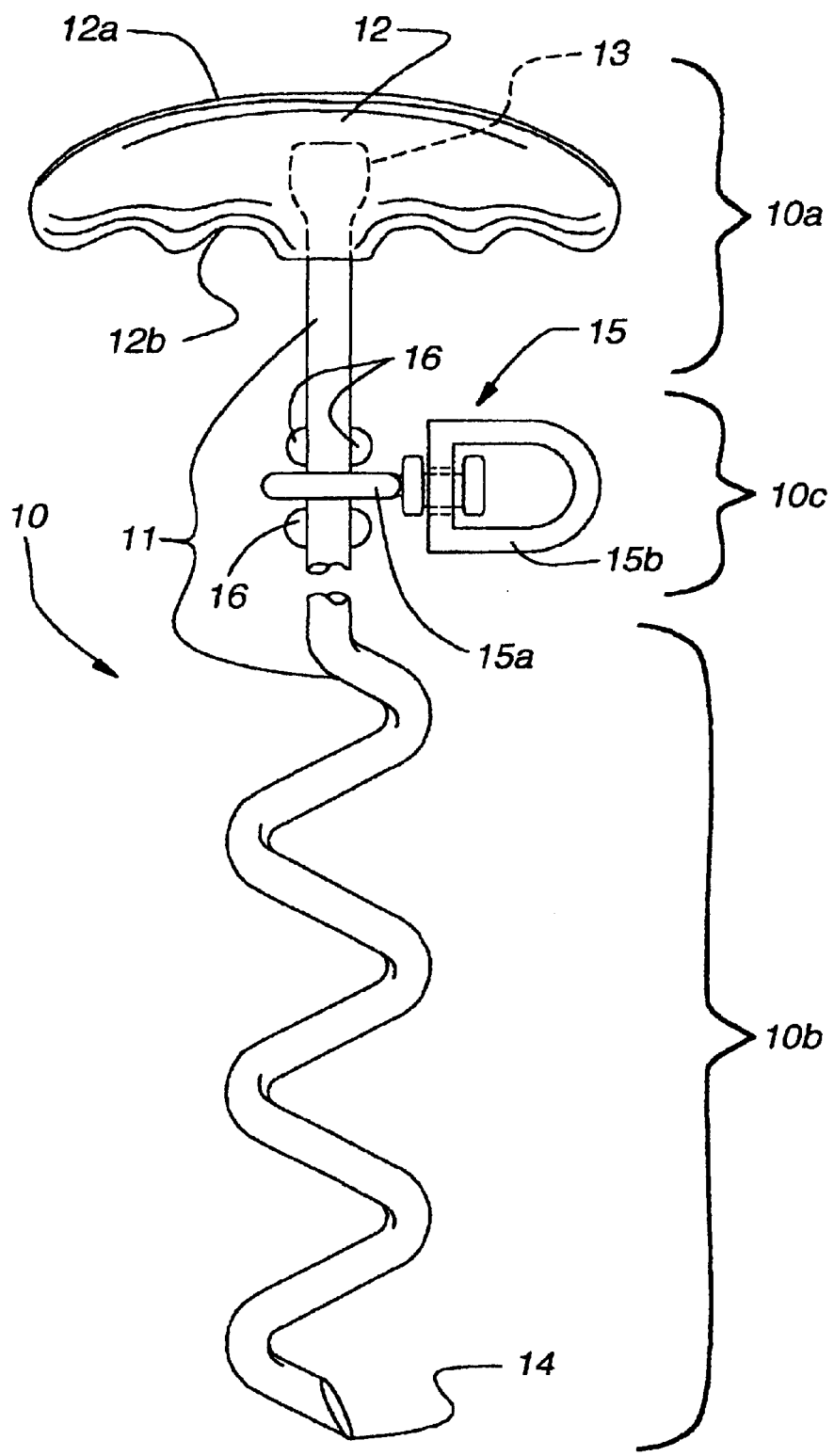
FIG. 1 is a front elevation of a spiral stake having a modified handle structure in accordance with an embodiment of the invention.

Referring now to the figures, and in particular FIG. 1, there is depicted, in accordance with the invention, a spiral stake, generally designated 10. Spiral stake 10 includes a handle section 10a, a spiral section 10b, and a transition section 10c extending therebetween. In the depicted embodiment, spiral stake is structurally comprised of a formed body 11 of suitably configured, rod-like material, advantageously terminating at a sharpened point 14 to facilitate penetration and subsequent downward advancement in the ground, and a handle 12 fixed thereto at a terminal end of the metal body 11. The rod-like material used to construct the stake is advantageously comprised in whole or in part of a metal having sufficient strength and dimension for the particular application. Other suitable materials can also be used without departure from the invention. General methods of bending or other fabrication techniques conventionally employed in forming the metal body of spiral stakes of known design, such as those currently available on the market, can conveniently be employed in the production of the body 11 of spiral stake 10 in accordance with an embodiment of the invention.

Figure 5:
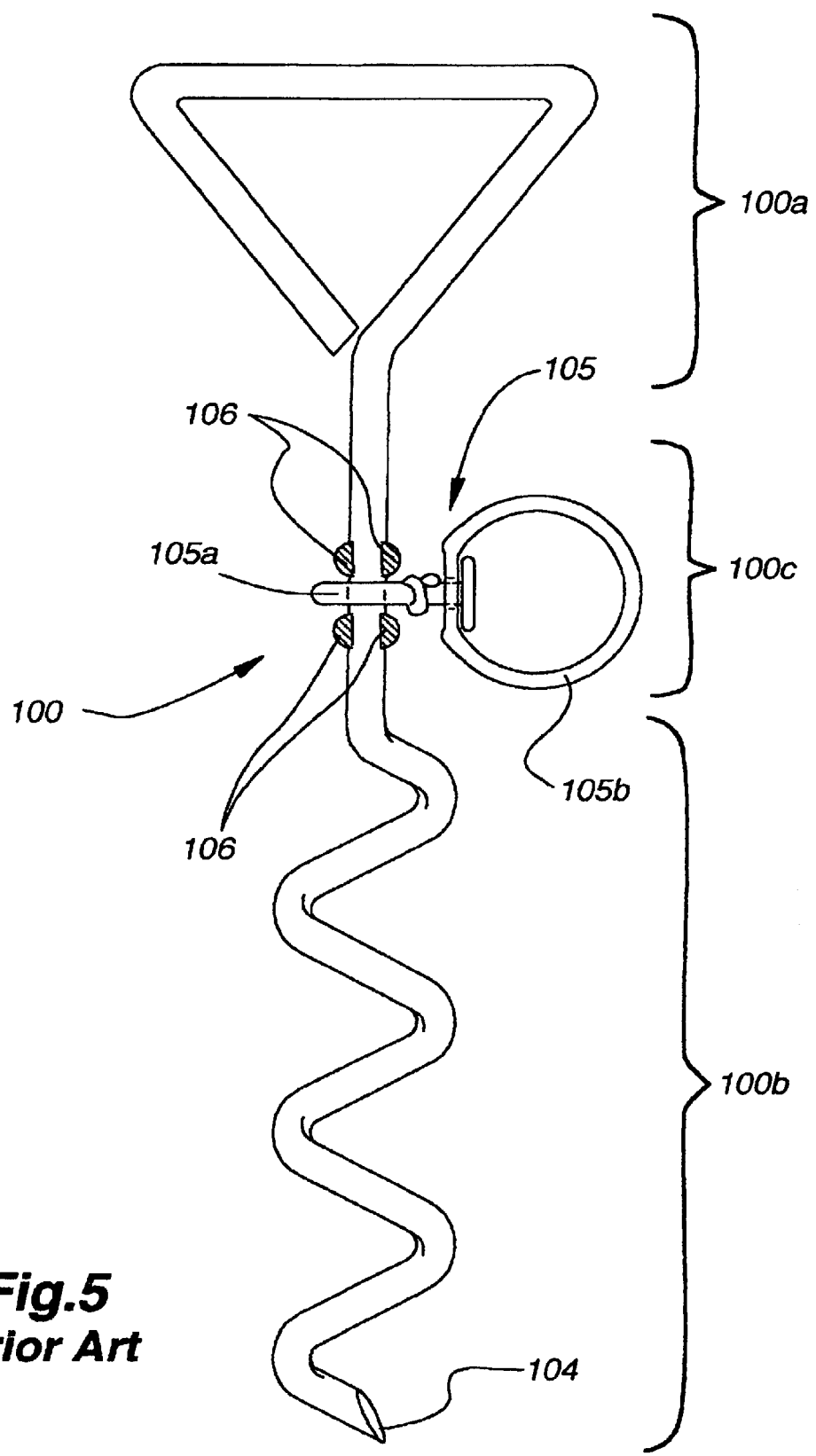
FIG. 5 is a front elevation of a conventional spiral stake.

In the depicted embodiment of FIG. 1, the spiral stake 10 further incorporates a swivel 15, provided in the region of the transition section 10c, configured in the depicted embodiment in accordance with conventional practice, and which is described generally above with regard to the example of FIG. 5. The swivel 15 includes an attachment portion 15a having a modified structure over that of FIG. 5, to the extent that the attachment portion is provided as a formed unit of ring shape, received on the metal body 11 and oriented in the transition section 10c prior to crimping of crimped areas 16 in the rod material comprising transition section 10c above and below swivel 15, which, as explained above herein, present flange-like sections preventing movement of attachment portion 15a of swivel 15 therepast. This modified structure is shown only to further illustrate a possible alternative design and is not intended to be construed as a limitation of the invention. The swivel 15 also includes a ring portion 15b captively held to the attachment portion 15a which, although presenting a slightly different shape than that of the prior art example of FIG. 5 (merely to illustrate that employment of various alternative designs is contemplated, as mentioned above), functions analogously thereto. Other suitable designs not specifically disclosed herein are also deemed acceptable.

As noted above, the handle 12 is securably maintained at a terminal end of the body 11, and is kept from turning relative to the body 11 when hand-applied torque is transferred thereto during an anchoring operation or during stake removal from the ground, advantageously by providing the portion of the metal body surrounded by the handle 12 with a suitable structural configuration which presents a non-circular cross-sectional shape. In the example of FIG. 1, the terminal end of the body 11 conveniently presents an area 13 of generally flattened and widened configuration. The handle 12 is then either molded about the terminal end of the body 11, for example, by suitable known injection molding practices such that it conformably envelopes the flattened area 13 or, alternatively, the handle 12 is provided as a prefabricated article which is received to the metal body 12 such that an internal structure of the handle 12 engageably accommodates the flattened area 13 in a manner preventing relative rotation therebetween. It is noted, that although depicted as a flattened area 13, such configuration can be any noncircular cross-sectional shape, for example, polygonal, star shape, oval, etc., without departure from the invention. In addition, any other suitable measures can alternatively be taken to prevent rotation of the handle, and such approaches are contemplated to be within the intended scope of the invention. For example a set screw (not shown) extending inward of the handle 12 and which engages or compressively contacts the body 11 can be used, or a hole provided across the metal body through which material connective with the handle 12 extends (also not shown). Further, when such a hole is provided, and the handle 12 is overmolded about the body, the molten thermoplastic will be made to flow through the hole and, when set, will prevent rotation.

The handle 12 includes a first contact surface 12a presenting a shape suited to ergonomic reception in a palm of a user when grasping the handle 12. Advantageously, the handle portion 12 further includes a second contact, surface 12b located on a side of the handle 12 opposed to the first contact surface 12a, shaped to present a series of curved indentations suited to conformable reception of fingers opposed to a thumb of the user. Since the handle 12 in the depicted embodiment of FIG. 1 includes portions which freely extend to either side of the body 11, the handle can be readily grasped by a user's hand regardless of a size thereof, with two fingers of the hand located on each of the two handle portions extending on either side of the body 11. When the handle 12 is so held, and the body 11 extends downwardly between the middle and ring fingers of the hand grasping the handle 12.

Figure 2:
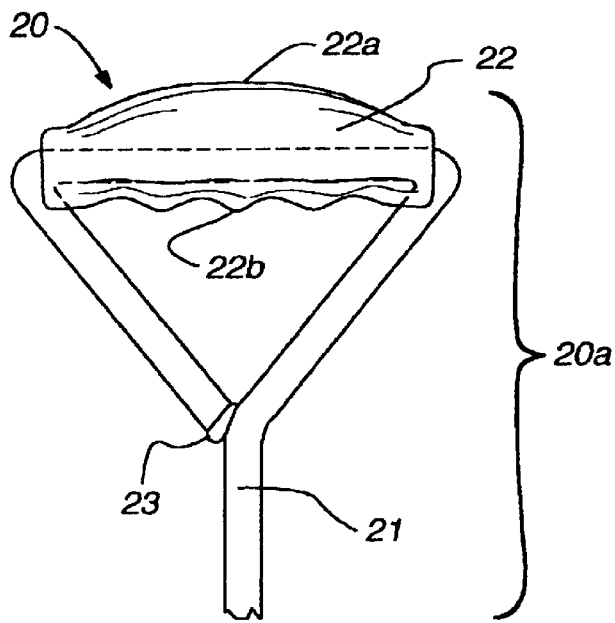
FIG. 2 is a partial front elevation of a spiral stake detailing a handle structure in accordance with another embodiment of the invention.

Turning now to FIG. 2, an alternative embodiment directed to a stake 20 is shown, and in which all elements are analogous with those described with regard to the embodiment of FIG. 1, with the exception of the configuration of a handle section 20a. For this reason, only a handle section 20a of the stake 20, which includes a handle 22, is illustrated to avoid unnecessary redundancy. In this embodiment, the stake 20 is comprised of a formed body 21 of suitably configured, rod-like material, spiraled at a lower end and advantageously terminating at a sharpened point (not shown) to facilitate penetration and subsequent downward advancement in the ground. A generally triangular configuration is adopted for the portion of the body 21 within the region of the handle section 20a, and the handle 22 surrounds at least the leg of such triangle running orthogonal to a penetration axis of the stake 20 (the axis arranged vertically in FIG. 2). Although the example depicts a handle section 20a of triangular shape which fully encloses the fingers of a user's hand grasping the handle 20, other shapes can be employed which do not frilly enclose the fingers, for example, a shape in which the third leg of the triangle is omitted. Alternatively, another shape other than a triangle, i.e., polygonal or otherwise, can be adopted without departure from the intended scope of the invention. As in the previous embodiment, the handle 22 includes a first contact surface 22a presenting a shape suited to ergonomic reception in a palm of a user when grasping the handle 22, and advantageously, also a second contact surface 22b, located on a side of the handle 22 opposed to the first contact surface 22a, shaped to present a series of curved indentations suited to conformable reception of fingers opposed to a thumb of the user (four fingers in the depicted example). As an additional option, the handle configuration can be further modified over that of the prior art stake depicted in FIG. 5, in a manner which avoids the potential for tangling attendant such conventional design. As shown in FIG. 5, a gap is present between the end of the rod material comprising the triangularly configured handle section 100a and the body of the stake. As a result, tieouts or chains attached to the stake often get snagged in this gap, resulting in entangling of the dog or other pet. Therefore, in accordance with the embodiment of FIG. 2, this gap is advantageously eliminated by suitable measures, for example, conveniently by a application of a weld bead 23, as shown.

Figure 3:
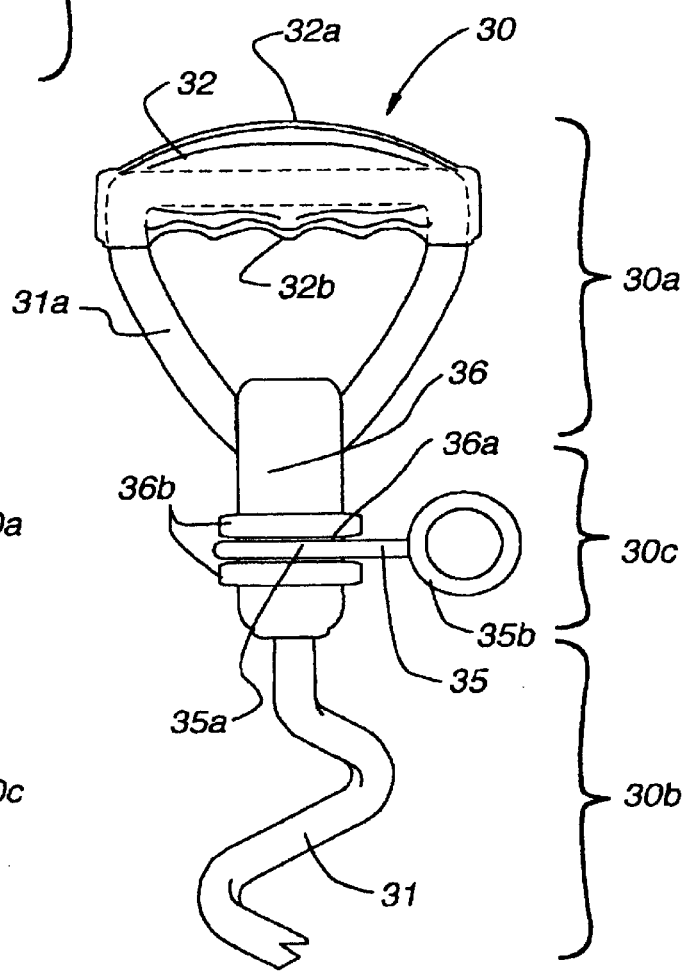
FIG. 3 is a partial front elevation of a spiral stake detailing a handle structure and modified swivel mechanism in accordance with yet another embodiment of the invention.
Figure 4:
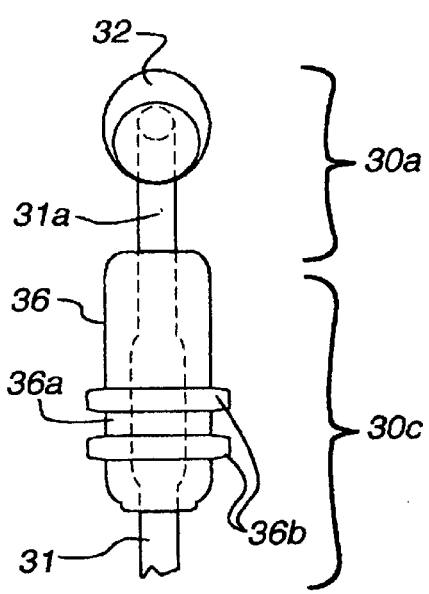
FIG. 4 is partial side elevation of the stake of FIG. 2.

Turning now to FIGS. 3 and 4, another embodiment in accordance with the invention is depicted. As in the previously described embodiments, a stake 30 includes a formed body 31 of suitably configured, rod-like material, and which includes a handle section 30a, a spiral section 30b advantageously terminating at a sharpened point (not shown) to facilitate penetration and subsequent downward advancement in the ground, and a transition section 30c extending therebetween. The embodiment differs from the previous embodiments in that a handle support 31a is provided which is of flattened shape, and which is advantageously contiguous with the body 31. The handle support 31a is depicted conveniently as having a generally triangular configuration, although any suitable shape is contemplated. It is advantageously fully enclosing for structural integrity and operating strength. A handle 32 is carried about the handle support 31a, conveniently formed by suitable thermoplastic overmolding techniques. The flattened configuration of the handle support 31a (best seen in FIG. 4) inherently prevents pivoting of the handle 32, thereby assuring maintenance of the proper positioning of both a first contact surface 32a which, in accordance with a significant feature of the invention, presents a shape suited to ergonomic reception in a palm of a user when grasping the handle 12, and advantageously, a second contact surface 32b, located on a side of the handle 32 opposed to the first contact surface 32a, which is shaped to present a series of curved indentations suited to conformable reception of fingers opposed to a thumb of the user.

In the depicted embodiment, the stake 30 further includes a structural adaptation for inhibiting binding or tangling between the swivel and the stake to which it is rotatably mounted. A swivel body 36 is provided in the transition region 30c, advantageously comprised of a thermoplastic material, and which is conveniently overmolded about the body 31. The swivel body 36 includes a circumferential channel 36a extending entirely around the swivel body defined by a pair of radially extended circular flanges 36b. A swivel 35 (depiction of which is omitted in FIG. 4) is provided which includes a washer-shaped mounting portion 35a which is captively retained in the channel 36a to permit free rotation about the swivel body 36, and a ring portion 35b for reception of a tether or other restraint. Such structural feature more reliably prevents binding of the swivel 35 and inhibits tangling of the tether.

It is noted, that in each of the embodiments described herein, or any embodiment embraced within the scope of the invention as claimed not specifically exemplified herein, an outer region of the handle 12 can be constructed, in whole or in part, to include a cushioned region comprised of padded material which yields to applied pressure, such as, for example, a foam or other suitably resiliently compressible material, to thereby provide increased comfort when hand force is applied to accomplish anchoring or removal of the stake.

Having described preferred embodiments of the invention with reference to the accompanying drawings, it is to be understood that the invention is not limited to those precise embodiments, and that various changes and modifications may be effected therein by one skilled in the art without departing from the scope of the invention as defined in the appended claims.

What is claimed is:

1. A spiral anchoring stake for installation into a substrate, the spiral anchoring stake comprising an elongated, formed body having a first end and a second end, said formed body being shaped into three integrally-form sections, including
  a handle-receiving section disposed at said first end of said formed body;
  a transition section disposed in between said first end and said second end of said formed body and integrally joined with said handle-receiving section; and
  a spiral section disposed at said second end of said formed body and integrally joined with said transition section, said spiral section having a longitudinal axis and being adapted for advancement downward into the substrate when said spiral section is rotated about said longitudinal axis;

a shaped handle affixed to said handle-receiving section of said formed body, said shaped handle comprising
  a first contact surface shaped for reception in a palm of a human hand when said shaped handle is grasped; and
  a second contact surface located on a side of said shaped handle opposed to said first contact surface and forming a plurality of curved indentations adapted to accommodate human fingers;

a swivel rotateably affixed to said transition section; and a swivel body overmolded about a portion of said transition section, wherein said swivel body comprises a circumferential channel extending around said swivel body, said circumferential channel being defined by a pair of radially extended circular flanges, and wherein said swivel is rotatably affixed to said circumferential channel.

2. The spiral anchoring stake of claim 1, wherein said swivel further comprises
  a mounting portion that is captively retained in said circumferential channel of said swivel body, and
  a ring portion for reception of a restraint.

* * * * *